June 17, 1930.         H. WALLACE                    1,763,682
                  REFRIGERATING APPARATUS
                   Filed Feb. 8, 1926
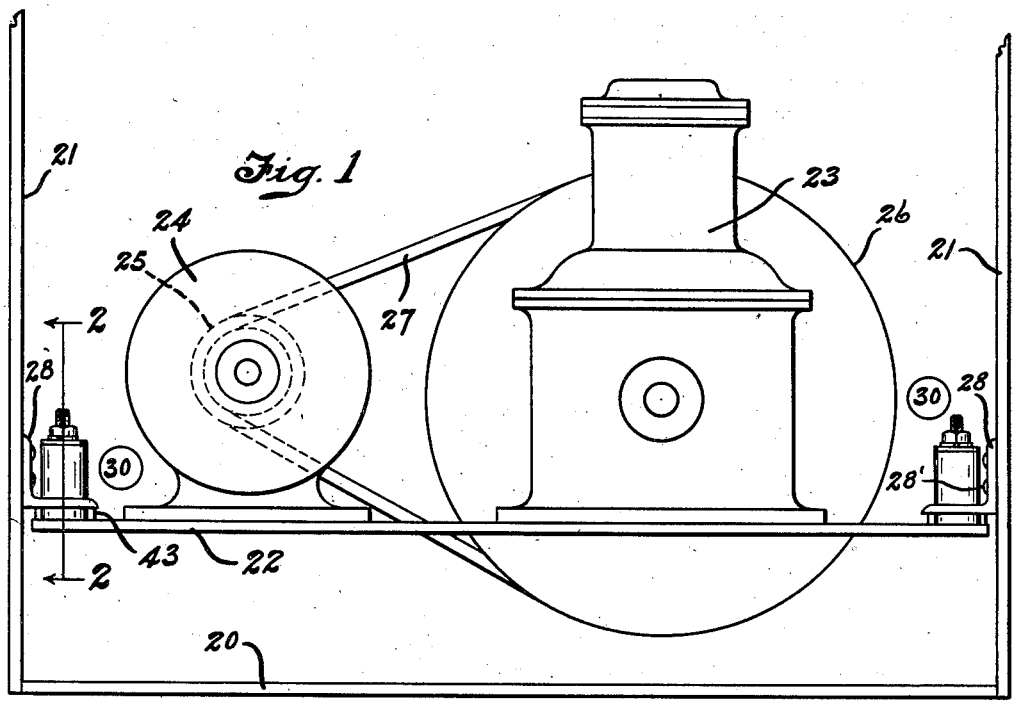
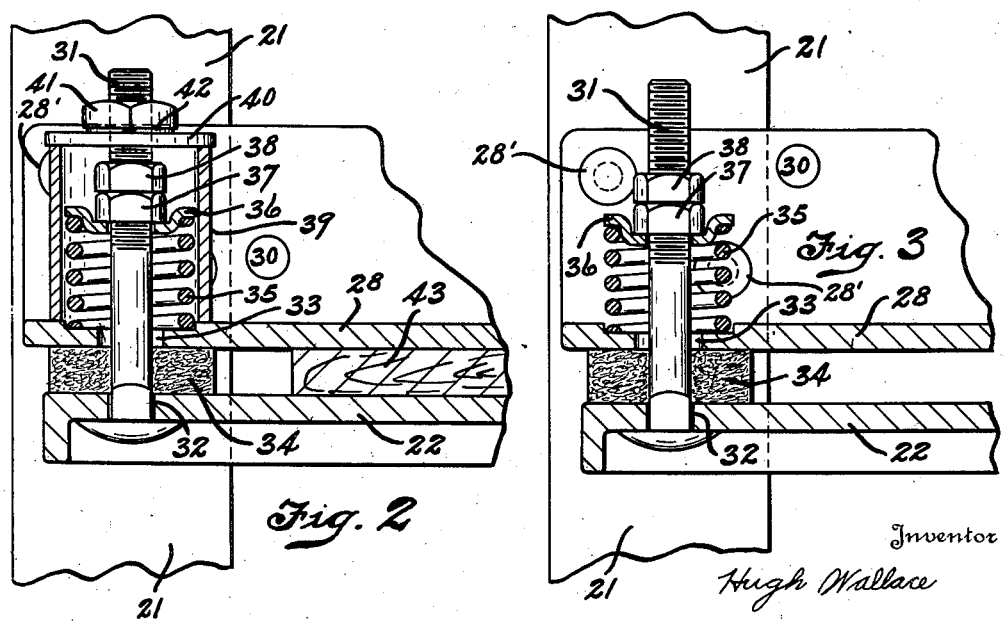
Inventor
Hugh Wallace
By Spencer, Sewall and Hardman
his Attorneys Patented June 17, 1930

1,763,682

UNITED STATES PATENT OFFICE

HUGH WALLACE, OF DAYTON, OHIO, ASSIGNOR, BY MESNE ASSIGNMENTS, TO FRIGID-AIRE CORPORATION, A CORPORATION OF DELAWARE

REFRIGERATING APPARATUS

Application filed February 8, 1926. Serial No. 86,770.

This invention relates to refrigerating apparatus, and particularly to the operating mechanism for such apparatus. In mechanical household refrigerating systems it is desirable to produce a smooth running, noiseless and vibrationless apparatus. These machines are usually placed in the kitchen or pantry, and any noise or vibration produced by them is annoying to persons in their vicinity. This invention has been made to eliminate these undesirable features.

Another object of this invention is to design a flexible support adapted to be used in conjunction with any moving apparatus in which the elimination of vibration and noise is desired.

Another object is to provide a simple and convenient means for holding a flexible support rigid during the transportation thereof.

Further objects and advantages of the present invention will be apparent from the following description, reference being had to the accompanying drawings, wherein a preferred form of embodiment of the present invention is clearly shown.

In the drawings:

Fig. 1 is an elevational view of a motor and compressor mounted on a common base supported according to this invention.

Fig. 2 is a sectional view, on the line 2—2 of Fig. 1 and on an enlarged scale, of one of the spring supports for the base, in the shipping position.

Fig. 3 is a sectional view similar to Fig. 2 but showing the spring support in operating position, and with certain parts removed.

Referring in detail to the drawings, 20 denotes the bottom, and 21 two of the side walls, of a refrigerating cabinet. Mounted within the cabinet on a base 22 are the compressor 23 and driving motor 24. The motor is adapted to drive the compressor through pulleys 25, 26, and belt 27. The base 22 is supported from angle irons 28 which are attached to the side walls 21 of the cabinet by any suitable means, such as rivets 28'. The angle member serves as a means for relatively limiting the lateral movement of the base as hereinafter described.

The support for the base is designated generally by numeral 30 and includes a long square-necked bolt 31 adapted to pass upwardly through a square opening 32 in the base 22. The cylindrical part of the bolt extends through an opening 33 in the base of angle iron 28. The opening 33 is of considerably larger diameter than the bolt 31 so that lateral movement of the bolt in the opening is possible. Between the base 22 and angle iron 28 is interposed a washer 34 of flexible material such as felt which serves as a frictional means for limiting the lateral movement and vibrations of the base with respect to the angle member. Seated in a depression in the base of the angle iron and surrounding the bolt 31 is a spring 35 on which rests a circular dished plate 36. A nut 37 screw-threaded on bolt 31 and in contact with plate 30 enables the spring 30 to carry the weight of the base and the apparatus mounted thereon. The nut 37 when adjusted is held in place by a lock nut 38.

In assembling the device, the nut 37 is so adjusted that while the spring 35 supports its portion of the load it is permitted to expand enough to allow the felt washer 34 to make sliding frictional contact with the underside of the base of the angle iron as shown in Fig. 3. In this way vertical vibration is absorbed by the spring while lateral vibration is dampened to a considerable extent by the braking action of the washer on the angle iron base.

In preparing the apparatus for shipping, a sleeve 39 is placed around the spring 35 and rests on the base of the angle iron. The upper end of the sleeve supports a circular disc 40, through which disc the bolt 31 passes. A nut 41 is screw-threaded on the bolt above disc 40, and a spring washer 42 is interposed between the nut and the disc. A block of wood 43 of suitable length and of substantially the same thickness as the washer 34 is then interposed between the base 22 and angle iron 28.

The nut 41 is then drawn up tightly; thus relieving the weight of the base 22 from the spring 35 and transferring it to the sleeve 39 and disc 40, as shown in Fig. 2. This affords a rigid connection between the base and the refrigerator cabinet. In practice four of these suspension points are provided, two of which are shown, although any desired number may be used. When each nut 41 has been tightened, the connection between the base and the cabinet is rigid throughout and thus the apparatus is in condition for handling during transportation.

When the refrigerating apparatus has been installed, nut 41, wood block 43, sleeve 39, disc 40 and washer 41 are removed as shown in Fig. 3 to prevent any noise which might arise from the rattling of these loose parts. The spring 35 then assumes the weight of the base and its appended apparatus as before described.

While the form of embodiment of the present invention as herein disclosed, constitutes a preferred form, it is to be understood that other forms might be adopted, all coming within the scope of the claims which follow.

What is claimed is as follows:

1. In a refrigerator cabinet including a wall, a base for refrigerating machinery, means for supporting said base in non-vibratory resilient relation to said wall, said means comprising a supporting member carried by said wall, a spring mounted on the top side of said supporting member, a member secured to the base below the supporting member and carried by the spring and a layer of yielding friction material between the base and said supporting member.

2. In a refrigerator cabinet including a wall, a base for refrigerating machinery, means for supporting said base in non-vibratory resilient relation to said wall, said means comprising a support mounted on said walls and adapted to carry said base, a rigid member engaging said base and suspensorily carried by said support, a resilient member between said rigid member and said support and a layer of yielding frictional material between said base and said support.

3. In a refrigerator cabinet including a wall, a base for refrigerating machinery, means for supporting said base in non-vibratory resilient relation to said wall, said means comprising a support mounted on said wall and overhanging said base, a rigid member engaging said base and suspensorily carried by said overhanging support, resilient means between said rigid member and said overhanging support, a layer of yielding frictional material between said base and said overhanging support and detachable means for rendering said resilient means inoperative whereby to make a rigid connection between said base and said wall.

4. In a refrigerator cabinet including side walls, a base for refrigerating machinery, means for supporting said base in non-vibratory resilient relation to said walls, said means comprising a carrying support mounted on said walls and overhanging said base, a bolt engaging said base and suspensorily carried by said overhanging support, a plate carried by said bolt at the end opposite said base, a spring between said plate and said base, means for varying the position of said plate to adjust the tension of said spring and a layer of yielding frictional material between said base and said overhanging support.

5. In a refrigerator cabinet including side walls, a base for refrigerating machinery, means for supporting said base in non-vibratory resilient relation to said walls, said means comprising a carrying support mounted on said walls and overhanging said base, a bolt engaging said base and suspensorily carried by said overhanging support, a plate carried by said bolt at the end opposite said base, a spring between said plate and said base, means for varying the position of said plate to adjust the tension of said spring, a layer of yielding frictional material between said base and said overhanging support, a rigid sleeve surrounding said spring and detachable means for transferring the weight of said base from said spring to said sleeve.

In testimony whereof I hereto affix my signature.

HUGH WALLACE.